(12) United States Patent
Freeman et al.

(10) Patent No.: US 8,498,397 B2
(45) Date of Patent: Jul. 30, 2013

(54) CALL HANDLING FOR INCOMING TELEPHONE CALLS

(75) Inventors: Karen Freeman, Toronto (CA); David Robert MacPhie, Toronto (CA); Nasahn Adam Sheppard, Mill Valley, CA (US); Jason Edward Short, San Francisco, CA (US); Stephan Georgiev, St-Hubert (CA)

(73) Assignee: BCE Inc., Verdun, Quebec (CA)

( * ) Notice: Subject to any disclaimer, the term of this patent is extended or adjusted under 35 U.S.C. 154(b) by 931 days.

(21) Appl. No.: 12/344,007

(22) Filed: Dec. 24, 2008

(65) Prior Publication Data

US 2009/0175430 A1 Jul. 9, 2009

(30) Foreign Application Priority Data

Dec. 28, 2007 (CA) ..................................... 2616495

(51) Int. Cl.
*H04M 3/42* (2006.01)

(52) U.S. Cl.
USPC ................. 379/207.16; 379/372; 379/373.01; 379/373.02; 379/373.03; 379/373.04

(58) Field of Classification Search
USPC ................. 379/207.16, 372–376.02
See application file for complete search history.

(56) References Cited

U.S. PATENT DOCUMENTS

| | | | |
|---|---|---|---|
| 5,636,218 A | 6/1997 | Ishikawa et al. | |
| 5,978,451 A * | 11/1999 | Swan et al. | 379/88.24 |
| 6,058,178 A * | 5/2000 | McKendry et al. | 379/212.01 |
| 6,263,071 B1 | 7/2001 | Swan et al. | |
| 6,407,997 B1 | 6/2002 | DeNap et al. | |
| 6,597,764 B1 | 7/2003 | Haze | |
| 6,597,794 B2 | 7/2003 | Cole et al. | |
| 6,778,661 B1 | 8/2004 | Yumoto et al. | |
| 6,826,173 B1 | 11/2004 | Kung et al. | |
| 6,831,899 B1 | 12/2004 | Roy | |
| 7,782,854 B2 | 8/2010 | Sakata et al. | |
| 2003/0161454 A1* | 8/2003 | Nassimi | 379/93.09 |
| 2004/0196833 A1 | 10/2004 | Dahan et al. | |
| 2004/0213401 A1* | 10/2004 | Aupperle et al. | 379/372 |
| 2005/0100152 A1* | 5/2005 | Pearson | 379/207.16 |

(Continued)

OTHER PUBLICATIONS

Non-Final Office Action issued by the United States Patent and Trademark Office on Jun. 26, 2012 in connection with U.S. Appl. No. 12/020,047, 18 pages.
Final Office Action issued by the United States Patent and Trademark Office on Jan. 29, 2013 in U.S. Appl. No. 12/020,047, 16 pages.

*Primary Examiner* — Joseph J Nguyen
(74) *Attorney, Agent, or Firm* — Finnegan, Henderson, Farabow, Garrett & Dunner, LLP

(57) ABSTRACT

Provided is a method for handling telephone calls directed to a telephony connection associated with a plurality of telephone numbers, wherein incoming calls made to the plurality of telephone numbers are announced by different ring tones. The method comprises receiving over the telephony connection a signal carrying ring tone information indicative of an incoming call. The method further comprises processing the ring tone information to differentiate the ring tone currently conveyed in the telephony connection from other possible ring tones that the telephony connection can carry. The method still further comprises handling the incoming call on the basis of the differentiated ring tone. Also provided are a telephone system and a computer readable storage medium holding a program element.

68 Claims, 6 Drawing Sheets

U.S. PATENT DOCUMENTS

| | | |
|---|---|---|
| 2005/0147086 A1 | 7/2005 | Rosenberg et al. |
| 2005/0207556 A1* | 9/2005 | Gonzalez et al. ........ 379/207.16 |
| 2006/0026277 A1* | 2/2006 | Sutcliffe ....................... 709/224 |
| 2006/0062358 A1 | 3/2006 | Pearson et al. |
| 2008/0125095 A1 | 5/2008 | Mornhineway et al. |
| 2008/0192657 A1 | 8/2008 | Vagelos |

* cited by examiner

CALL HANDLING FOR INCOMING TELEPHONE CALLS

CROSS-REFERENCE TO RELATED APPLICATION

This application claims priority under 35 U.S.C. 119 of Canadian Patent Application 2,616,495 filed on Dec. 28, 2007 and hereby incorporated by reference herein.

FIELD OF THE INVENTION

The present invention relates to telephony solutions and in particular to methods and devices for handling calls received over a telephone connection.

BACKGROUND OF THE INVENTION

In the past, certain local telephony service providers have offered a differentiated ringing service for households wanting to have two numbers on the same connection. When a caller places a call to one of the numbers associated with the household, the analog ring tone signal sent to the handsets in the household will vary based on the telephone number dialed. As a result, the handsets in the house will ring differently depending on the phone number dialed by the caller.

With this service, two (or more) different telephone numbers can be associated to the same telephone connection and all the phones at the customer premises ring either one of two (or more) ways, depending on the phone number called. Thus when a caller dialed the first number, all the phones in the household rang one way and when the caller dialed the second number, all the phones rang a second, slightly different way.

While this service allowed users in a household to identify without picking up the intended recipient of incoming phone calls, it does not allow a user to avoid getting disturbed by telephone calls not intended for them. However, it is well known that different users in a household, workplace, or other premises may have vastly varying phone usage habits/requirements. Yet it can be very frustrating to a user to be constantly disturbed by phone calls intended for another user, particularly when he/she cannot allow himself to unplug the telephone for fear of missing an important call.

In the context of the above, it can be appreciated that there is a need in the industry for a telephony solution that overcomes at least some of the disadvantages of the prior art.

SUMMARY OF THE INVENTION

In accordance with a first broad aspect, the present invention provides a computer readable storage medium holding a program element for execution by a processor to implement a system for processing calls directed to a telephony connection. The program element comprises an input interface to receive a signal over the telephony connection conveying ring tone information indicative of an incoming call. The program element further comprises a processing element coupled to the input interface. The processing element processes the ring tone information to differentiate the ring tone currently conveyed in the signal from other possible ring tones that the signal can convey and then handles the incoming call on the basis of the differentiated ring tone.

In accordance with a second broad aspect, the present invention provides a telephone system, having a base station with an input for connection to a telephony connection conveying ring tone information indicative of an incoming call. The telephone system also comprises a processing element coupled to the input for processing the ring tone information to differentiate the ring tone currently conveyed over the telephony connection from other possible ring tones that can be conveyed over the telephony connection. The processing element handles the incoming call on the basis of the differentiated ring tone.

In accordance with a third broad aspect, the present invention provides a method for handling telephone calls directed to a telephony connection associated with a plurality of telephone numbers, wherein incoming calls made to the plurality of telephone numbers are announced by different ring tones. The method comprises receiving over the telephony connection a signal conveying ring tone information indicative of an incoming call. The method further comprises processing the ring tone information to differentiate a ring tone currently conveyed over the telephony connection from other possible ring tones that the telephony connection can convey. The method further comprises handling the incoming call on the basis of the differentiated ring tone.

In accordance with a fourth broad aspect, the present invention provides a computing apparatus comprising an input for connection to a telephony connection conveying ring tone information indicative of an incoming call. The computing apparatus further comprises a processing element coupled to the input for processing the ring tone information to differentiate a ring tone currently conveyed over the telephony connection from other possible ring tones that can be conveyed over the telephony connection; and handling the incoming call on the basis of the differentiated ring tone.

These and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of examples of implementation of the present invention is provided hereinbelow with reference to the following drawings, in which.

Figure 1:
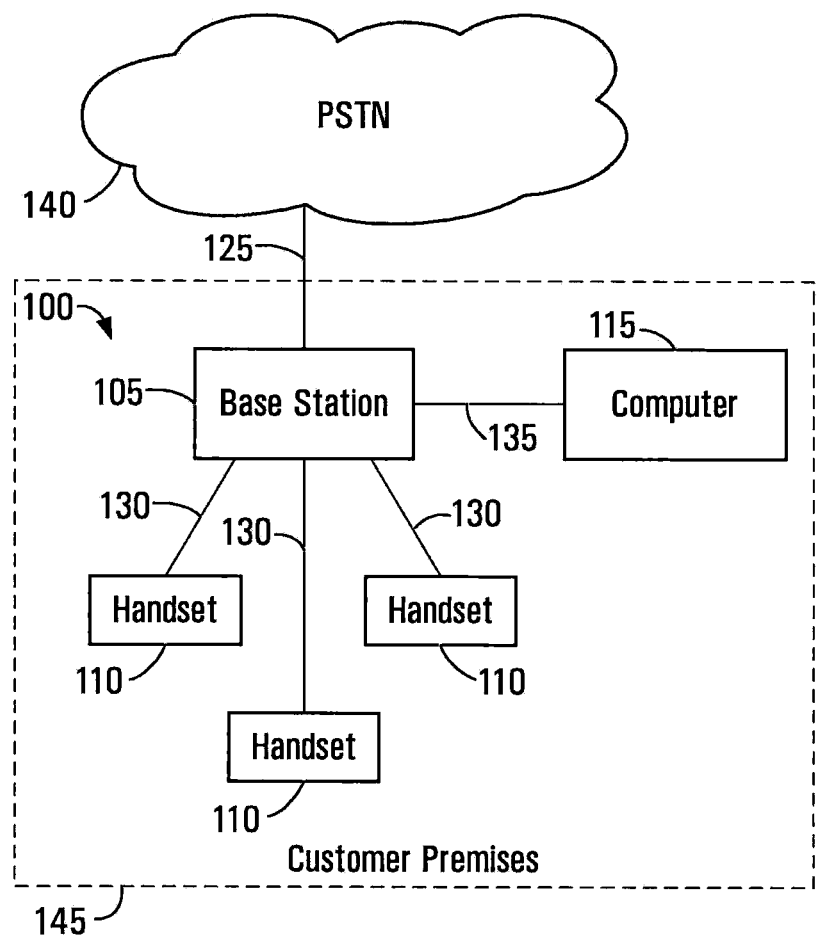
FIG. 1 is a block diagram of a telephony system in accordance to a non-limiting example of implementation of the invention.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION

FIG. 1 shows a telephone system in accordance with a non-limiting example of implementation of the invention. A customer has, at customer premises 145 a plurality of handsets 110 connected to a base station 105. Base station 105 has a connection 125 to the public switched telephone network (PSTN) 140. Handsets 110 have respective handset connections 130 to base station 105 for exchanging telephony data therewith. The connections 130 can be wireline, wireless or a combination of both.

The connection 125 is a telephony connection that links base station 105, at the customer premises to a telephone network such as the PSTN. In a non-limiting example, PSTN connection 125 is an analog copper-wire link between base station 105 and the demarcation point. In this example, the demarcation point marks the edge of the customer premises where the local loop begins. Here, the local loop is a standard twisted pair terminating in a circuit switch, for example in a central office. However, the local loop may include a digital loop carrier system segment or fiber optic transmission system known as fiber-in-the-loop.

Figure 2:
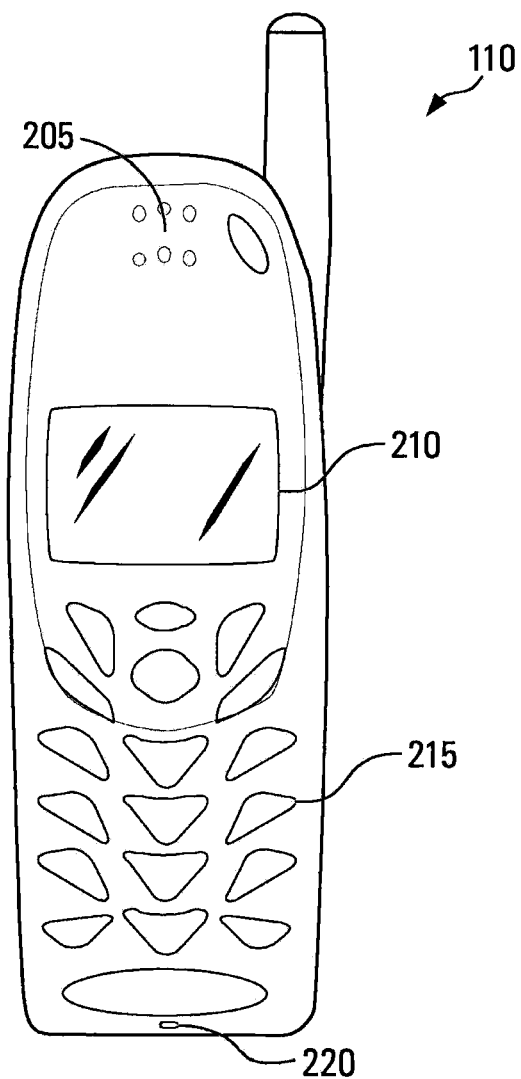
FIG. 2 shows a handset for use in the system of FIG. 1 in accordance to a non-limiting example of implementation of the invention.

Handset 110 can be any suitable user telephony interface but in the example illustrated in FIG. 2, handset 110 is a standard cordless (wireless) telephone having a display screen 210, a keypad 215, a speaker 205 and a microphone 220. Handset 110 includes a communication module for communicating with base station 105 over handset connection 130. In some embodiments, handset 110 communicates with base station 105 using the Digital Enhanced Cordless Telecommunications (DECT) protocol. In these embodiments, handset 110 does not need to be connected to a physical RJ11 or other phone jack. Here, if handset 110 has a docking station, it needs only to be a charger connected to a power outlet. It is to be understood that handset 110 may also be a traditional analog POTS-type phone. In this case, the handset 110 may be completely unaware that it is connected to the PSTN via a base station 105, the base station 105 emulating the traditional POTS interface for the handset 110. One skilled in the art will appreciate that there are many possible configurations of handset 110 that can be used without departing from the intended scope of the invention. For example, handset 110 may have a sophisticated display screen with a touch-screen input or handset 110 may have a basic dot-matrix screen or no display screen at all. Likewise, although handset 110 is described here as communicating over the DECT protocol, this is not necessarily the case and any communication means, wired or wireless, can be used as connection to base station 105. While handset 110 has been shown here in a specific embodiment, any handset 110 known in the art can be used and handset 110 can even be a fax machine. In this instance, the fax machine is deemed to be a potential call recipient.

Figure 3:
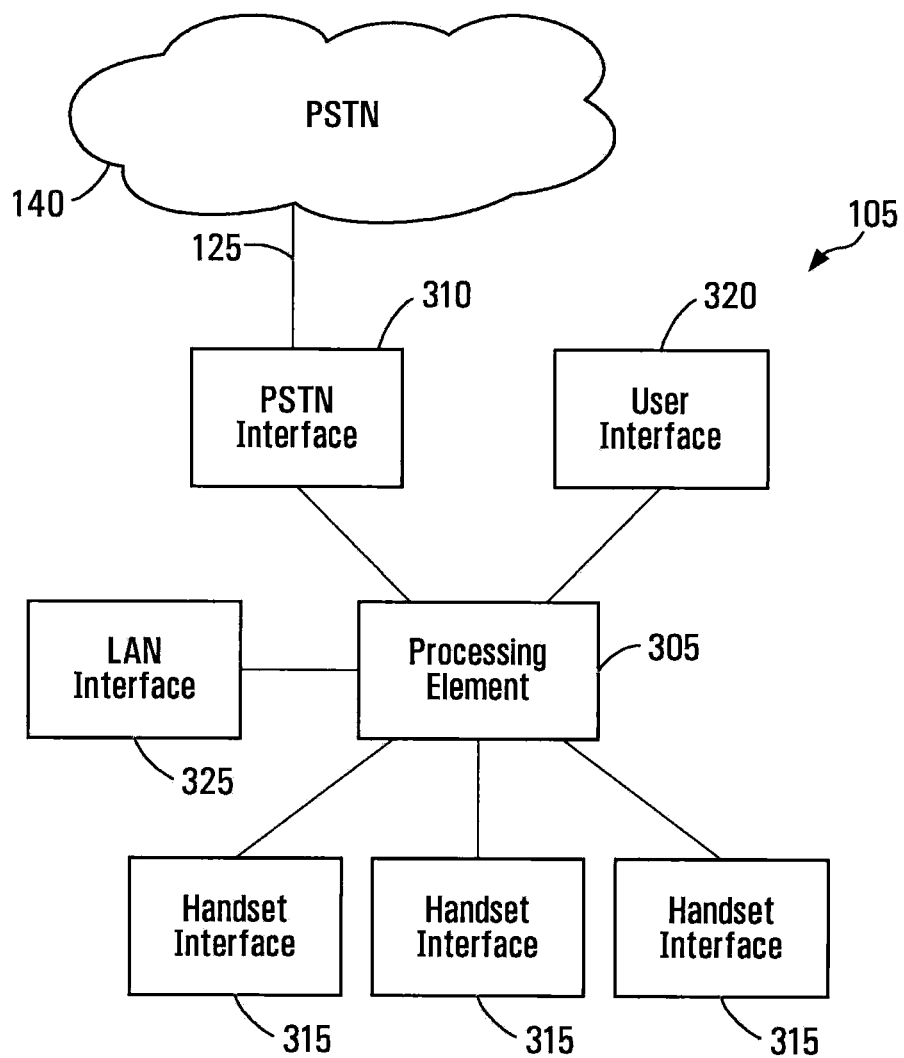
FIG. 3 shows a block diagram of a base station used in the system shown in FIG. 1.

FIG. 3 shows a block diagram representation of base station 105 in accordance with a non-limiting example of implementation of the invention. Here, base station 105 has a PSTN interface 310 for exchanging telephony information such as voice, fax, or modem data over network 140. PSTN interface 310 constitutes an input interface for receiving signals over the telephony connection and forwarding them to the processing element 305 that will be described later. PSTN interface 310 may optionally include a modem interface for exchanging digital data, at least in part over network 140. For example, PSTN interface 310 may include a DSL modem that can exchange digital data at the same time as telephony data is being exchanged. In another example, PSTN interface 310 may include a dialup modem that can be used intermittently while a phone call is not in progress.

Optionally, a local area network interface 325 may permit base station 105 to communicate with a computing device at customer premises 145. This may be useful, for example, when the base station 105 includes a modem. In this case, the base station may act as a connection to the Internet for one or more computers at customer premises 145.

Base station 105 also has a plurality of handset interfaces 315 for interfacing with handsets 110. Handset interfaces 315 may be suitable for permitting wireless exchanges with handsets 315 or for wired exchanges. Alternatively a single handset interface may be provided to handle the communications between the base station 105 and the handsets 110. For instance, a single handset interface 315 may communicate with all handsets 110 over, e.g., a single frequency, a specific handset 110 being addressed by any appropriate means such as by a handset-specific ID.

Furthermore, base station 105 also has a user-interface 320 that allows a user to interface with base station 105 such as to change settings. The user interface may have a display (not shown) and an input mechanism allowing the user to input commands and/or data. The input mechanism can be a keyboard and/or a pointing device. Alternatively, speech recognition or touch sensitive surfaces can be used. If the base station 105 is physically small, the input mechanism can include a limited set of keys to fit space restrictions while allowing the user to input all the necessary commands. Another possibility is to provide soft keys that may use part of the display to identify their purpose or function.

Processing element 305 controls interfaces 310, 315, 320, and 325 and handles incoming calls in the manner described below.

Base station 105 may be implemented by any suitable means. In a non-limiting example, base station 105 is a dedicated hardware comprising a processor with a computer-readable storage medium holding a program element for execution by the processor to implement the functionality of the system described herein. However, base station 105 may also be implemented by software (program element) for execution by a general-purpose computer, such as a customer's personal computer. One skilled in the art will appreciate that base station 105 may also be implemented by dedicated circuitry behaving in the manner described below.

The base station 105 can be provided with signal translation capabilities if the handset connections 130 and PSTN connection 125 do not use the same signal format for exchanging telephony information. In this case, the base station 105 serves as a gateway, translating voice and/or data between network 140 and handsets 110. In a non-limiting embodiment, a handset connection 130 is a digital wireless connection implemented with the DECT protocol and PSTN connection 125 is an analog connection over a twisted pair. Telephony information from a caller received at base station 105 over network 140 arrives in analog form and is digitized by an analog-to-digital converter (A to D) present in PSTN interface 310 prior to being forwarded to a handset 110 used in a phone call. Once digitized, telephony information is further encoded by a codec and wirelessly transmitted by handset interface 315 to handset 110. In the other direction, telephony information arrives wirelessly from a handset 110 to base station 105 in encoded format and is decoded by an appropriate codec and converted to analog form by a digital-to-analog converter (D to A) prior to transmission over PSTN connection 125 by PSTN interface 310. Optionally, if multiple handsets 110 are in use at the same time, base station 105 may transfer telephony information received from a handset 110 to the other handsets 110 in use without altering it.

In another non-limiting embodiment where the PSTN connection 125 and the handsets 110 use the same signal format for exchanging telephony information, base station 105 may simply forward telephony information from one to the other without altering it. In this case, base station 105 may optionally copy and decode or otherwise transform the exchanged information in order to analyze it, even as it transfers it unaltered.

Figure 6:
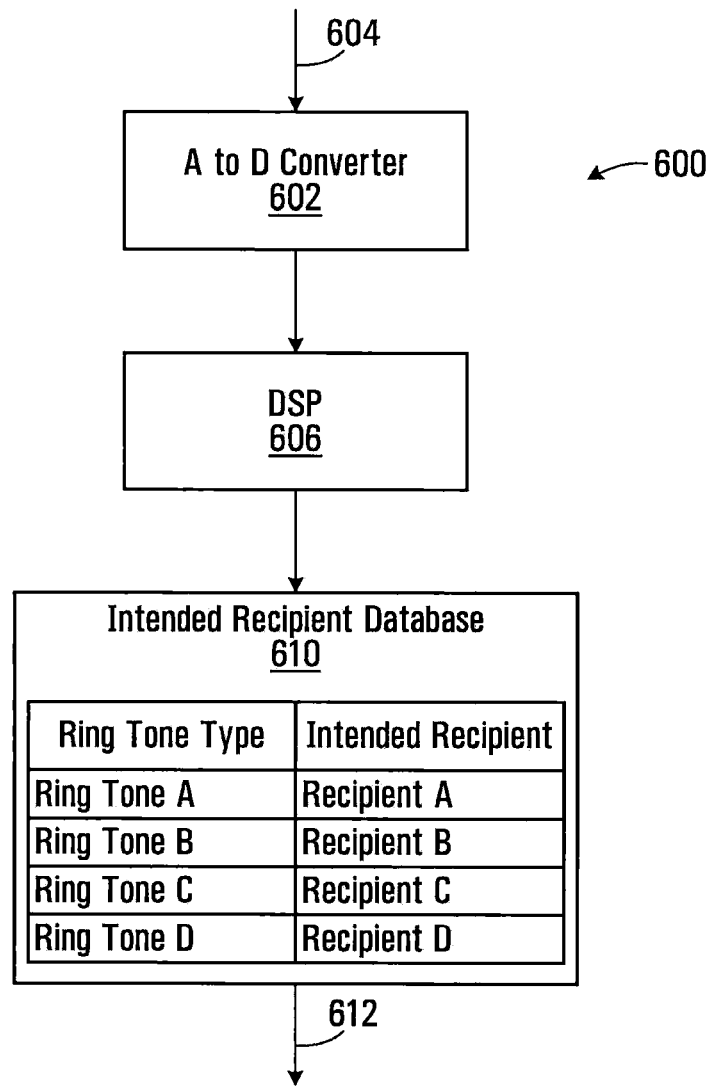
FIG. 6 is a block diagram illustrating certain components of the processing element shown in FIG. 3.

Processing element 305 includes a ring tone decoder 600 that is capable of distinguishing amongst several different ring tones that are impressed on the telephony connection 125. A ring tone is an electric signal that generates a ring sound to prompt a user to answer an incoming call. The ring tone can contain a single tone, such as a 90 volt, 20 Hz frequency tone or a complex combination of tones capable of producing sound effects such as melodies or songs. A block diagram of a non-limiting embodiment of the ring tone decoder 600 is shown in FIG. 6. It should be understood that the ring tone decoder is only one component of the processing element 305. For clarity and conciseness the ring tone decoder 600 is the only component that is being shown and described in connection with FIG. 6. Remaining components discussed earlier have not been illustrated. Furthermore, it should be understood that ring tone decoder 600 may lie partially or entirely outside processing element 305. For example, some or all of the functions of ring tone decoder 600 may be implemented in PSTN interface 310 and/or may be implemented as a stand-alone element external to processing element 305.

In a non-limiting embodiment, call requests conveying ring tone information are received over PSTN connection 125. The ring tone information may correspond to a certain pattern of voltage over a wired link to the network 140. For example, the ring tone information may correspond to a fluctuation of voltage on the tip and ring of a twisted pair which, as indicated earlier may be a 90 volt, 20 Hz frequency signal.

In a non-limiting embodiment, the ring tone decoder 600 has an analog to digital (A to D) converter 602 which receives at its input 604 the ring tone over the telephony connection 125. In this example, the digitized ring tone is then passed to a Digital Signal Processor (DSP) 606 which performs digital signal processing on the ring tone in order to differentiate the current ring tone from other ring tones that may be applied on the telephony connection 125. The ring tone differentiation can be done by using any suitable algorithms. In a non-limiting embodiment, the algorithm classifies the ring tone on the basis of sound wave patterns, such as frequency and amplitude, among other possible features. Once the classification has been completed the DSP 606 may then try to match the results against all the ring tone patterns that the DSP 606 is intended to recognize. The ring tone patterns may be stored in a DSP 606 ring tone memory (not shown in the drawings) and the DSP 606 may try to match the classification results against the stored ring tone patterns. In this case, if a match is found, then the identity of the ring tone, which can be a simple identification number, is released from the output 608 of the DSP 606. Optionally, if the ring tone information is not recognized, then the DSP 606 may default to an error condition or may output the identity of a default ring tone.

In order to account for noise and other distortion that may have slightly corrupted the received signal prior to reception at base station 105, processing element 305 may use any suitable comparison algorithm to identify which table entry most closely resembles the ring tone detected. In different networks or with different telephony service providers, different formats of signals may be used and the ring tone may be conveyed in different manners. It is to be understood that any format for the signal and ring tone may be used and that the invention is not intended to be limited to any one particular format used.

Note that during the ring tone detection, the ring tone decoder 600 may be designed to perform the processing on the ring tone signal to perform the identification first, without providing any external notification, and subsequently when the ring tone has been identified to issue an incoming call alert. In this fashion, the ring tone decoder 600 will let the telephony connection ring, without generating any incoming call alert, for a period of time sufficiently long to allow the ring tone to be identified. At that point, the incoming call can be handled on the basis of rules determined by the identified ring tone.

Optionally, ring tone detector 600 may also be adapted to identify an intended recipient of a call, from among a plurality of recipients susceptible to receiving calls over PSTN connection 125. In this case, the identity of the recognized ring tone may be supplied to a local database 610, implemented by any suitable memory storage device. The local database 610 can then map ring tone identifiers to respective call recipients. For example, in the case of ring tone A, recipient A is identified by the local database 610 as corresponding to that ring tone. In some embodiments, other information such as information on the call originator (e.g. caller line ID) may be used in addition to the ring tone for establishing an intended recipient. It is to be expressly understood that identifying an intended recipient is an optional step that can be dispensed with out departing from the spirit of the invention.

Local database 610 outputs the identity of the intended recipient at output 612. At that point, the call can be handled by rules determined on the basis of the ring tone detected or optionally the identity of the intended recipient.

A specific example of operation of the system 100 will now be described. In this non-limiting embodiment, call requests are conveyed to the system 100 from the network 140 using differentiated ring tones. In this example, a plurality of different telephone numbers are associated with the same telephony connection. When any one of those telephone numbers is dialed, a call is received at the customer premises 145 over the telephony connection, the ring tone distinguishing the telephone number dialed to originate the call.

In this example, the customer is a two-adult, two-child household and there are four recipients: a parent (office), a fax machine in the office, both parents (personal) and the children. Each of the four recipients may have their own telephone number. The customer premises 145 in this example is a household with an office, a recreational room, a living room, children's room and a parents' room. When a call for the children is received, base station 105 analyzes the ring tone information and optionally identifies the intended recipient. Once the ring tone has been distinguished from among the other possible ring tones (and optionally the intended recipient has been identified), the processing element 305 uses logic to determine how the incoming call is to be handled. The logic can be implemented by software executed by the processing element 305 that defines the call handling rules to be followed when the intended recipient has been recognized. Optionally, it may be possible for the user to personalize the call handling rules such that each intended recipient can decide how the call will be handled. The call handling rules can be customized via any suitable interface, such as through the handsets 110, via the interface 320 of the base station 105 or via other user interfaces as will be discussed later.

Specific examples of call handling rules will be discussed below. A call handling rule may be setup to select to which handset(s) 110 from among a set of handsets 110 at a customer premises 145 the call will be linked. In a non-limiting embodiment, once a handset 110 is selected, base station 105 links the call to the handset 110 and causes it to ring. For example, the base station 105 can handle the call by causing the handsets 110 in the recreational room and in the children's room to ring normally and display caller information (e.g. a caller identification), by causing the handsets 110 in the living room and parents' room to beep once and display caller information and by causing the handset 110 in the office not to react (such that a parent working in the office does not get disturbed by the children's phone call).

In a non-limiting embodiment, once a call has been linked to a certain handset 110, the base station 105 may prevent other handsets 110 from ringing or may cause them to react (e.g. by ringing) in a different manner than the selected handset 110. In this fashion, the selected handset 110 may produce a first ring sound and the other handsets 110 may also ring but they may use a different ring sound, such as to allow a user to audibly identify the handset 110 to which the call is directed.

Rules can also be set to determine how the call will be handled when no one answers the call once the call has been routed to a certain handset 110. One possible example is to route the call to another handset 110, say the parents' handset 110. Optionally, if no one answers the handset to which the call is routed, then the process may be repeated and the call may be routed to another handset 110 until all the handsets 110 have been exhausted. In this example, the call handling rules define the first handset 110 to which the call will be routed first, which is the one associated with the intended recipient and also define the order in which the remaining handsets 110 will be addressed. Of course, it is not necessary in such an embodiment for every handset 110 to be sequentially rung. For example, a plurality of handsets 110 may occupy the same place in the order (ring at the same time), and some handsets 110 may be absent from the order.

When no one answers the call, call handling rules can be set to determine how voice mail will be invoked. One simple case is to invoke a single voice mail box that is common to all recipients where a message can be left. Another option is to selectively invoke a voice mail system on the basis of the ring tone or of the intended recipient. In the case where each ring tone or intended recipient (except the fax machine) is associated to a distinct voice mail box within a voice mail system, each of the voice mail boxes may have their own voice prompt to invite the caller to leave a message. In this case, the call handling logic, upon identification of the ring tone or intended recipient, will trigger the voice prompt associated with that ring tone or intended recipient. When the voice prompt has been played and assuming the caller desires to leave a message, then the logic will enable the recording of a message from the calling party within the voice mail box associated with the ring tone or intended recipient.

In yet another embodiment, there may be only one voice mail box but a plurality of voice prompts, each associated with a ring tone or intended recipient. In this case, the voice prompt played could depend on the ring tone or the intended recipient but the voice mail message left by the call originator may be recorded within a common voice mail box. It is to be understood that the voice mail prompt may be any suitable prompt, and may or may not include a voice message. The voice mail prompt may include, for instance an audio cue without any utterance or speech. In another example, the voice mail prompt may be a message, either generic or recorded by a user, inviting a call originator to leave a voice mail message.

Along with or instead of directing a handset 110 to ring to notify users of an incoming call, the processing element 305 may direct the handset 110 to which the call is being routed to display a visual incoming call alert. This visual incoming call alert may appear on the display 210 of the handset. One option is to display a text message indicative of the intended recipient. The text message may be sent to handset 110 in any suitable manner and in one non-limiting embodiment, it is sent in the format used to send caller line ID information. For example, base station 105 may replace caller line ID information received over PSTN connection 125 with a text message, such as the identity of the intended recipient extracted from the database 610, to be conveyed to the handset 110. Alternatively, base station 105 may keep all or portions of the caller line ID information and supplement it with additional information prior to forwarding it to the handset 110. Another possibility is to show an image or pictogram or even play a video clip that designates the intended call recipient. Note that the visual incoming call alert can also be provided in conjunction with a ring tone.

The visual incoming call alert can be particularly useful when a single handset 110 is being used with the base station 105. In such case, the visual incoming call alert may be displayed on the display 210 of the handset 110 to indicate the identity of the intended recipient. Note that, in some instances, the visual incoming call alert can be the only way for individuals in the customer premises 145 to distinguish the identity of the called party. For instance, when the ring function of the handset 110 has been muted or when a generic ring tone is used for all phone calls.

When ring tone information or an intended recipient corresponds to a piece of equipment, such as a fax machine, the rules that are set can be such as to prevent any one of the handsets 110 to ring. Therefore, all the handsets 110 remain silent and no one is disturbed in the house when a fax is received. The fax machine may also be connected into a phone jack and receive the ring tone and may answer normally after the predetermined number of rings. Alternatively, a fax machine may be caused to answer automatically any call destined to it, without needing to emit a ring.

More sophisticated call handling rules can be implemented by taking into account other parameters such as temporal changes (time of day and date parameters). For instance, different call handling rules can be defined for different times of day or days of the week. For example, during day time when the children are at school, the call handling rules can stipulate that all the handsets 110 will ring when a call is received, irrespective of the ring tone or identity of the call recipient. However, after school hours, different call handling rules may apply such as to direct a call only to the children's room and/or the recreational room handsets 110 if the intended recipient is a child. As well, in the above example, calls intended to the parents may cause all handsets 110 to ring during the day time (e.g. when the children are at school) and cause only the handset in the parents' room to ring at night. Also, optionally, calls intended to the children may automatically be forwarded to voicemail during the daytime and cause the phone in the children's room and recreational room to ring in the afternoon.

Figure 4:
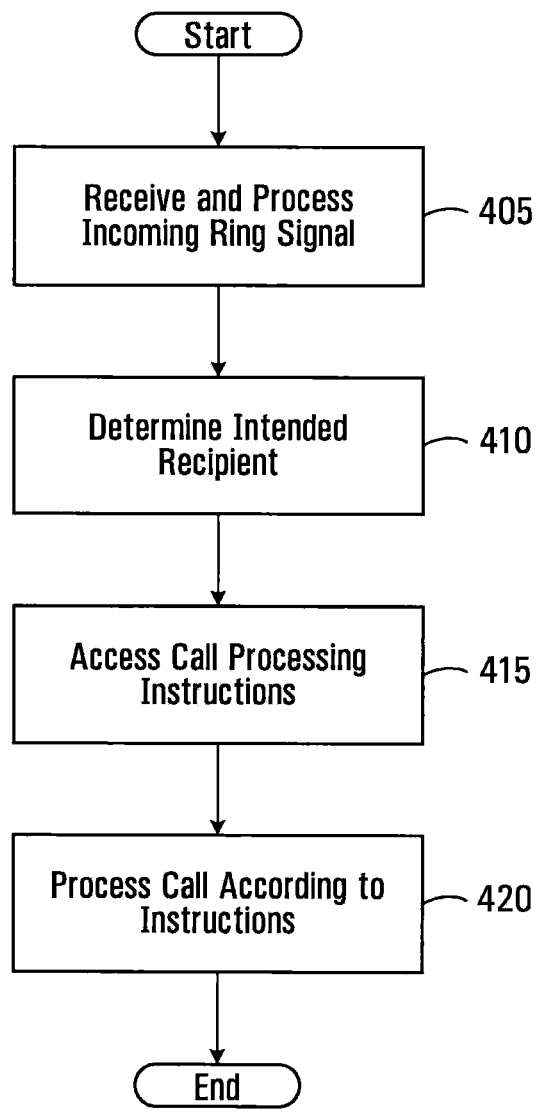
FIG. 4 is a flow chart depicting an exemplary operation of the base station of FIG. 3.

The behavior of base station 105 in the non-limiting embodiment described above can be broadly described as the four-step process described in FIG. 4. Once a call request is received, at step 405, the incoming signal is accepted and the ring tone contained therein may be processed. In a non-limiting embodiment, at step 405 incoming ring tone information is detected and digitized.

Step 410 is an optional step. Here, the ring tone information is analyzed to determine the intended recipient. In this step, information contained in the digitized ring tone is preferably looked up in a reference table to identify the intended recipient, as discussed earlier At step 415, the processing element 305 accesses rules on how to handle the call. The instructions are at least in part related to the ring tone information and may also relate to an intended recipient identified in step 410. In a non-limiting embodiment, every potential ring tone (and, optionally, intended recipient) has associated with it instructions on how to handle calls for it (there may be default instructions, for ring tones or recipients with no specified instructions). It is not necessary for the instructions to be all the same. For example, there can be conditional instructions (e.g. ring childrens' handset only between 7 am-11 pm) or time-varying instructions (e.g. change my ring tone every day). These instructions can be kept in a table or elsewhere in memory and preferably can be changed by a user via user interface 320.

Finally, at step 420, the processing element 305 handles the call according to the instructions obtained at step 415. A large number of different ways of handling calls exist, any of which may be used. For example, at step 420, the base station may:
- cause a particular subset (one or more) of customer handsets 110 to ring for a predetermined amount of time (or rings);
- in case of the above, and when no one has picked the call, cause a second subset of customer handsets 110 to ring;
- cause one or more customer handsets 110 to provide a visual (e.g. text or graphic) indicator of an intended recipient (e.g. display the name of the intended recipient, display a picture of the intended recipient, display a color associated with the intended recipient, etc);
- cause one or more customer handsets 110 to provide an audio indicator of an intended recipient (e.g. play a ring tone associated with a recipient, speak out the intended recipient's name);
- cause the call to be forwarded to a particular voice mail box;
- prevent a handset 110 that was not selected from ringing;

It is not necessary for base station 105 to always handle the call in accordance with the instructions obtained at step 415. External or other factors may cause an exception to the rule. For example, if a phone call is directed to one of the telephone numbers associated with the PSTN connection 125 while the PSTN connection 125 is already in an active call, a call waiting function could be enabled by the PSTN network 140. In this case, the network 140 could provide a distinctive call waiting ring tone based upon the specific telephone number that was dialed; the call waiting ring tone acting as a type of ring tone information. When receiving the distinctive call waiting ring tone, the base station 105 may proceed with a similar process as discussed above with reference to FIG. 4. In particular, the base station 105 may detect the call waiting tone and, prior to or in parallel to conveying the ring tone to the handset(s) in the active call, determine the call handling rules to be applied for that particular ring tone (or the recipient associated with that particular ring tone). The call handling rules could include providing a visual indication of the intended recipient of the call and/or providing a distinctive audio indication on one or more handsets 110. This visual and/or audio indication may be directed to only the handset(s) 110 that are in the active call or could be provided to one or more other handsets 110. Alternatively, the call handling rules could comprise directing the incoming call to a voice mail system and, in particular, potentially to a specific voice mail box associated with the call waiting tone or intended recipient.

For example, if an incoming call is intended for the children in the above example, but the PSTN connection 125 is already in an active call, the caller may be provided a busy signal, be forwarded to a specific voice mail box based on the call waiting tone information or be offered to the party on the active call using an audio and/or visual indication of the intended recipient.

Although numerous options are provided for providing visual and/or audio indications to the handsets 110 in the above description, it should be noted that if a traditional POTS telephone is connected to base station 105 to be used as a handset 110, the POTS telephone may not benefit from all the functionality likely found in other handsets such as wireless DECT handsets. Thus, the handling options for the POTS telephone may be limited to whether or not to ring and the ring tone that is utilized. In such a case, the limitations of the POTS telephone may be taken into consideration by base station 105 when handling the call.

In the non-limiting embodiment described, base station 105 comprises a user interface 320. In an example, user interface 320 allows a user to change the settings of base station 105 such that incoming calls are handled differently. For example, a user may be able to add or remove recipients from a list of all the possible recipients at customer premises 145. A user may also be able to change the way the base station 105 determines whether an incoming call is intended for a recipient or set a default recipient.

At user interface 320, the user may also be able to change the way calls are handled for each recipient, or change a default call handling. A user may also access other information such as the contact list (add, delete, modify entries) via user interface 320. In certain embodiments, user interface 320 may also be used for more technical activities such as adding an additional handset 110 to be connected to the base station or setting quality of service preferences.

Although the user interface 320 has been shown here uniquely as part of base station 105, it may be partially, or entirely, contained elsewhere. For example, some or all of the user interface functions may be provided to a user at a handset 110 via handset connection 130. Alternatively, a computer 115, in communication with base station 105 may be used to access user interface functions. The computer acting as user interface 320 may be directly linked to base station 105 via LAN connection 135 or, if base station 105 includes an internet connection, may be connected via the internet (e.g. user interface 320 could be a web page).

Figure 5:
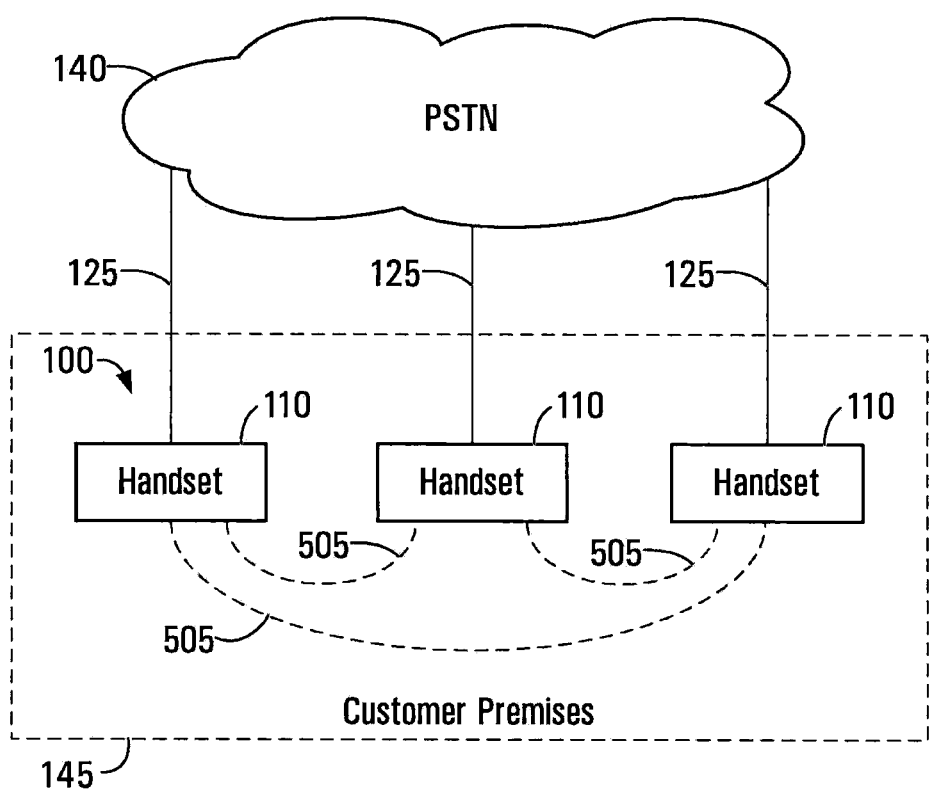
FIG. 5 shows a telephony system in accordance to a variant.

Although the system 100 has been depicted here as a centralized system with base station 105 having most of the intelligence, one skilled in the art will appreciate that the system 100 may be distributed, with one or more of the handsets 110 performing any one or more of the steps illustrated in FIG. 4. Thus a base station 105 may only be responsible for digitizing incoming data (step 405) and/or identifying the intended recipient (step 410) and forwarding it to handsets 110, the handsets 110 being responsible for steps (410,) 415 and 420. Alternatively, base station 105 may be entirely absent, as is the case in FIG. 5 where each handset 110 is connected directly to the network 140 via a common PSTN connection 125. In this and the previous embodiment, it may be necessary, if there is a plurality of handsets 110, for the handsets 110 to communicate with one another such as to ensure consistent call handling. To this end, handsets 110 may be connected to one another via handset-to-handset connections 505. In a non-limiting embodiment, handset-to-handset connections 505 are wireless connections.

While in FIG. 4, operations have been shown in the form of discrete steps, it is to be appreciated that steps 405, 410, 415 and 420 may be combined, or rearranged in any suitable order with departing from the intended scope of the invention. Optional step 410 may or may not be present.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A non-transitory computer readable storage medium holding a program element for execution by a processor to implement a system for processing calls directed to a telephony connection, the program element comprising:
   a) an input interface to receive a signal over the telephony connection conveying ring tone information indicative of an incoming call; and
   b) a processing element coupled to the input interface for:
      i. processing the ring tone information to differentiate a ring tone currently conveyed in the signal from other possible ring tones that the signal can convey, wherein to differentiate the ring tone, said processing comprises:
         classifying the ring tone information; and
         matching, using a comparison algorithm, the classification results against a plurality of stored ring tone patterns to identify a ring tone that most closely resembles the ring tone currently conveyed in the signal; and
      ii. handling the incoming call on the basis of the differentiated ring tone, wherein the handling includes identifying a handset among a set of handsets to which the incoming call is to be directed on the basis of the differentiated ring tone.

2. A computer readable storage medium as defined in claim 1, wherein the processing element is operative for distinguishing an intended recipient of the call from among a plurality of recipients susceptible to receiving a call over the telephony connection.

3. A computer readable storage medium as defined in claim 1, wherein at least one handset in the set of handsets is a cordless handset.

4. A computer readable storage medium as defined in claim 1, wherein the handling includes directing the identified handset to generate an incoming call alert to notify a user of the incoming call.

5. A computer readable storage medium as defined in claim 4, wherein the incoming call alert includes an audible component.

6. A computer readable storage medium as defined in claim 5, wherein the incoming call alert includes a ring sound.

7. A computer readable storage medium as defined in claim 4, wherein the incoming call alert includes a visual component.

8. A computer readable storage medium as defined in claim 7, wherein the visual component includes text based information.

9. A computer readable storage medium as defined in claim 4, wherein the incoming call alert provides a distinctive prompt allowing a user to differentiate the identified handset from other handsets in the set of handsets.

10. A computer readable storage medium as defined in claim 9, wherein the incoming call alert includes a ring sound generated at the identified handset.

11. A computer readable storage medium as defined in claim 10, wherein the incoming call alert includes a ring sound generated at the identified handset while the remaining handsets in the set of handsets are precluded from ringing.

12. A computer readable storage medium as defined in claim 10, wherein the incoming call alert includes a first ring sound generated at the identified handset and a second ring sound that is audibly distinct from the first ring sound generated at one or more of the remaining handsets from the set of handsets.

13. A computer readable storage medium as defined in claim 1, wherein if the identified handset does not answer the incoming call within a predetermined time, the processing including identifying a handset among the set of handsets other than the identified handset to which the incoming call is to be directed.

14. A computer readable storage medium as defined in claim 1, wherein the handling includes identifying a voice mail box among a set of voice mail boxes, to which the call is to be directed on the basis of the differentiated ring tone.

15. A computer readable storage medium as defined in claim 14, wherein the handling includes selecting a voice mail prompt among a set of voice mail prompts on the basis of the differentiated ring tone, wherein each voice mail prompt inviting the originator of the call to leave a voice mail message, including playing to the originator of the call the selected voice mail prompt.

16. A computer readable storage medium as defined in claim 1, wherein the incoming call is a voice call.

17. A computer readable storage medium as defined in claim 1, wherein the incoming call is a call waiting based call.

18. A telephone system, comprising:
   a) a base station having an input for connection to a telephony connection conveying ring tone information indicative of an incoming call;
   b) a processing element coupled to the input for:
      i. processing the ring tone information to differentiate a ring tone currently conveyed over the telephony connection from other possible ring tones that can be conveyed over the telephony connection, wherein to differentiate the ring tone, said processing comprises:
         classifying the ring tone information; and
         matching, using a comparison algorithm, the classification results against a plurality of stored ring tone patterns to identify a ring tone that most closely resembles the ring tone currently conveyed over the telephony connection; and
      ii. handling the incoming call on the basis of the differentiated ring tone, wherein the handling includes identifying a handset among a set of handsets to which the incoming call is to be directed on the basis of the differentiated ring tone; and
   c) at least one handset in communication with the base station at which an incoming call can be directed.

19. A telephone system as defined in claim 18, wherein the at least one handset is a cordless handset.

20. A telephone system as defined in claim 18, wherein the processing element is operative for distinguishing an intended recipient of the call from among a plurality of recipients susceptible to receiving a call over the telephony connection.

21. A telephone system as defined in claim 18, wherein the processing element is located in the base station.

22. A telephone system as defined in claim 18, including a set of handsets, the handling including selecting a handset among the set of handsets to which the incoming call is to be directed on the basis of the differentiated ring tone.

23. A telephone system as defined in claim 22, wherein the handling includes directing the selected handset to generate an incoming call alert to notify a user of the incoming call.

24. A telephone system as defined in claim 23, wherein the incoming call alert includes an audible component.

25. A telephone system as defined in claim 24, wherein the incoming call alert includes a ring sound.

26. A telephone system as defined in claim 23, wherein the incoming call alert includes a visual component.

27. A telephone system as defined in claim 26, wherein the visual component includes text based information.

28. A telephone system as defined in claim 23, wherein the incoming call alert provides a distinctive prompt allowing a user to differentiate the selected handset from other handsets in the set of handsets.

29. A telephone system as defined in claim 28, wherein the incoming call alert includes a ring sound generated at the selected handset.

30. A telephone system as defined in claim 29, wherein the incoming call alert includes a ring sound generated at the selected handset while the remaining handsets in the set of handsets are precluded from ringing.

31. A telephone system as defined in claim 29, wherein the incoming call alert includes a first ring sound generated at the selected handset and a second ring sound that is audibly distinct from the first ring sound generated at one or more of the remaining handsets from the set of handsets.

32. A telephone system as defined in claim 22, wherein if the selected handset does not answer the incoming call within a predetermined time, the handling including identifying a handset among the set of handsets other than the selected handset to which the incoming call is to be directed.

33. A telephone system as defined in claim 18, wherein the incoming call is a voice call.

34. A telephone system as defined in claim 18, wherein the incoming call is a call waiting based call.

35. A method for handling telephone calls directed to a telephony connection associated with a plurality of telephone numbers, wherein incoming calls made to the plurality of telephone numbers are announced by different ring tones, the method comprising:
    a) providing an input interface for receiving over the telephony connection a signal comprising ring tone information indicative of an incoming call;
    b) providing a processing element for processing the ring tone information to differentiate a ring tone currently conveyed over the telephony connection from other possible ring tones that the telephony connection can convey, wherein to differentiate the ring tone, said processing comprises:
        classifying the ring tone information; and
        matching, using a comparison algorithm, the classification results against a plurality of stored ring tone patterns to identify a ring tone that most closely resembles the ring tone currently conveyed in the signal; and
    c) handling the incoming call on the basis of the differentiated ring tone, wherein the handling includes identifying a handset among a set of handsets to which the incoming call is to be directed on the basis of the differentiated ring tone.

36. A method as defined in claim 35, further comprising the step of distinguishing an intended recipient of the call from among a plurality of recipients susceptible to receive a call over the telephony connection.

37. A method as defined in claim 35, wherein the handling including identifying a handset among a set of handsets at which the incoming call is to be directed on the basis of the differentiated ring tone.

38. A method as defined in claim 37, wherein the handling includes directing the selected handset to generate an incoming call alert to notify a user of the incoming call.

39. A method as defined in claim 38, wherein the incoming call alert includes an audible component.

40. A method as defined in claim 39, wherein the incoming call alert includes a ring sound.

41. A method as defined in claim 38 wherein the incoming call alert includes a visual component.

42. A method as defined in claim 41, wherein the visual component includes text based information.

43. A method as defined in claim 38, wherein the incoming call alert provides a distinctive prompt allowing a user to differentiate the selected handset from other handsets in the set of handsets.

44. A method as defined in claim 43, wherein the incoming call alert includes a ring sound generated at the selected handset.

45. A method as defined in claim 44, wherein the incoming call alert includes a ring sound generated at the selected handset while the remaining handsets in the set of handsets are precluded from ringing.

46. A method as defined in claim 44, wherein the incoming call alert includes a first ring sound at the selected handset and a second ring sound that is audibly distinct from the first ring sound generated at one or more of the remaining handsets from the set of handsets.

47. A method as defined in claim 38, wherein if the selected handset does not answer the incoming call within a predetermined time, the handling including identifying a handset among the set of handsets other than the selected handset to which the incoming call is to be directed.

48. A method as defined in claim 35, including selecting a voice mail box among a set of voice mail boxes, to which the call is to be directed on the basis of the differentiated ring tone.

49. A method as defined in claim 48, including selecting a voice mail prompt among a set of voice mail prompts on the basis of the differentiated ring tone, wherein each voice mail prompt inviting the originator of the call to leave a voice mail message, the method including playing to the originator of the call the selected voice mail prompt.

50. A method as defined in claim 35, wherein the incoming call is a voice call.

51. A method as defined in claim 35, wherein the incoming call is a call waiting based call.

52. A computing apparatus comprising:
    a) an input for connection to a telephony connection conveying ring tone information indicative of an incoming call;
    b) a processing element coupled to the input for:
        i. processing the ring tone information to differentiate a ring tone currently conveyed over the telephony connection from other possible ring tones that can be conveyed over the telephony connection, wherein to differentiate
            the ring tone, said processing comprises:
                classifying the ring tone information; and
                matching, using a comparison algorithm, the classification results against a plurality of stored ring tone patterns to identify a ring tone that most closely resembles the ring tone currently conveyed over the telephony connection; and
        ii. handling the incoming call on the basis of the differentiated ring tone, wherein the handling includes identifying a handset among a set of handsets to which the incoming call is to be directed on the basis of the differentiated ring tone.

53. A computing apparatus as defined in claim 52, wherein the processing element is operative for distinguishing an intended recipient of the call from among a plurality of recipients susceptible to receiving a call over the telephony connection.

54. A computing apparatus as defined in claim 52 incorporated within a base station.

55. A computing apparatus as defined in claim 52, wherein the handling including selecting a handset among a set of handsets to which the incoming call is to be directed on the basis of the differentiated ring tone.

56. A computing apparatus as defined in claim 55, wherein the handling includes directing the selected handset to generate an incoming call alert to notify a user of the incoming call.

57. A computing apparatus as defined in claim 56, wherein the incoming call alert includes an audible component.

58. A computing apparatus as defined in claim 57, wherein the incoming call alert includes a ring sound.

59. A computing apparatus as defined in claim 56, wherein the incoming call alert includes a visual component.

60. A computing apparatus as defined in claim 59, wherein the visual component includes text based information.

61. A computing apparatus as defined in claim 56, wherein the incoming call alert provides a distinctive prompt allowing a user to differentiate the selected handset from other handsets in the set of handsets.

62. A computing apparatus as defined in claim 61, wherein the incoming call alert includes a ring sound generated at the selected handset.

63. A computing apparatus as defined in claim 62, wherein the incoming call alert includes a ring sound generated at the selected handset while the remaining handsets in the set of handsets are precluded from ringing.

64. A computing apparatus as defined in claim 63, wherein the incoming call alert includes a first ring sound generated at the selected handset and a second ring sound that is audibly distinct from the first ring sound generated at one or more of the remaining handsets from the set of handsets.

65. A computing apparatus as defined in claim 55, wherein if the selected handset does not answer the incoming call within a predetermined time, the handling including identifying a handset among the set of handsets other than the selected handset to which the incoming call is to be directed.

66. A computing apparatus as defined in claim 52, wherein the incoming call is a voice call.

67. A computing apparatus as defined in claim 52, wherein the incoming call is a call waiting based call.

68. A computing apparatus as defined in claim 52, wherein the handling includes identifying a voice mail box among a set of voice mail boxes, to which the call is to be directed on the basis of the differentiated ring tone.

* * * * *